(12) United States Patent
Ng et al.

(10) Patent No.: US 7,782,240 B2
(45) Date of Patent: Aug. 24, 2010

(54) DEVICE AND METHOD OF SUPPLYING POWER TO TARGETS ON SINGLE-WIRE INTERFACE

(75) Inventors: Philip S. Ng, Cupertino, CA (US); Ken Ye, Fremont, CA (US)

(73) Assignee: Atmel Corporation, San Jose, CA (US)

( * ) Notice: Subject to any disclaimer, the term of this patent is extended or adjusted under 35 U.S.C. 154(b) by 422 days.

(21) Appl. No.: 11/754,879

(22) Filed: May 29, 2007

(65) Prior Publication Data

US 2008/0298385 A1  Dec. 4, 2008

(51) Int. Cl.
*H03M 1/12* (2006.01)
(52) U.S. Cl. ........................... 341/155; 370/447
(58) Field of Classification Search .................. 327/291; 341/136, 155
See application file for complete search history.

(56) References Cited

U.S. PATENT DOCUMENTS

| | | | | |
|---|---|---|---|---|
| 4,532,930 | A * | 8/1985 | Crosby et al. | 607/57 |
| 5,434,396 | A * | 7/1995 | Owen et al. | 235/380 |
| 5,508,702 | A * | 4/1996 | Estrada et al. | 341/136 |
| 5,812,004 | A * | 9/1998 | Little | 327/291 |
| 6,002,268 | A * | 12/1999 | Sasaki et al. | 326/41 |
| 6,122,199 | A * | 9/2000 | Zettler | 365/185.23 |
| 6,249,410 | B1 * | 6/2001 | Ker et al. | 361/56 |
| 6,363,066 | B1 | 3/2002 | Frimodig | |
| 6,412,072 | B2 | 6/2002 | Little et al. | |
| 6,532,506 | B1 | 3/2003 | Dunstan et al. | |
| 6,608,780 | B2 * | 8/2003 | Shau | 365/189.14 |
| 6,831,925 | B1 * | 12/2004 | Subrahmanyan et al. | 370/447 |
| 6,975,838 | B1 * | 12/2005 | Rofougaran et al. | 455/20 |
| 7,230,541 | B2 * | 6/2007 | Ripolone et al. | 340/853.2 |
| 7,332,780 | B2 * | 2/2008 | Matsuda et al. | 257/369 |
| 7,586,430 | B2 * | 9/2009 | Engl | 341/155 |
| 2001/0011353 | A1 | 8/2001 | Little et al. | |
| 2004/0252078 | A1 | 12/2004 | Fischer et al. | |
| 2005/0162129 | A1 * | 7/2005 | Mutabdzija et al. | 320/116 |
| 2005/0206505 | A1 * | 9/2005 | Arcaria | 340/286.01 |
| 2007/0167086 | A1 * | 7/2007 | Tolli | 439/712 |

FOREIGN PATENT DOCUMENTS

WO  WO-2008/150420 A1  12/2008

OTHER PUBLICATIONS

Dallas Semiconductor, www.maxim-ic.com, Application Note 147: Supplying Power via the 1-Wire Bus, Feb. 4, 2002, 5 pages.
"International Application Serial No. PCT/US2008/006795, International Search Report mailed Sep. 8, 2008", 3 pages.
"International Application Serial No. PCT/US2008/006795, Written Opinion mailed Sep. 8, 2008", 6 pages.

* cited by examiner

*Primary Examiner*—Thong H Vu
(74) *Attorney, Agent, or Firm*—Schwegman, Lundberg & Woessner, P.A.

(57) ABSTRACT

A single-wire interface communication system is capable of providing both electrical communication of signals and power between devices coupled to the system. Coupled to the single-wire interface is at least one target device which contains a PMOS transistor, a charge storage device, an inverter controlling the PMOS transistor, and a target device function. The charge storage device provides power to the target device function and to the inverter. The PMOS transistor receives power from the single-wire interface at a power-supply voltage level and charges the charge storage device to the same level. Non-communication periods produce a charging period sufficient for the charge storage device to attain the power-supply voltage level.

12 Claims, 4 Drawing Sheets

DEVICE AND METHOD OF SUPPLYING POWER TO TARGETS ON SINGLE-WIRE INTERFACE

TECHNICAL FIELD

The present invention relates to single-wire interfaces, more particularly, to single-wire interfaces where a target device is supplied with both signals and power over the single-wire interface.

BACKGROUND ART

A single-wire interface plays an important part in communicating between devices where a complex bus structure is not effective. The lack of effectiveness of a complex bus may be due to either cost or a system constraint, such as area for routing a bus, as may be the case in a vehicle. A single wire bus is able to provide signaling to implement a bidirectional protocol between bus elements and power to a target device.

With reference to FIG. 1A, a single-wire interface 105 couples a master device 110 to a target device 115 in a prior art single-wire-interface system 100. The master device 110 is coupled to an external power supply VDD 120 and ground, and to the single-wire interface 105 via a line 125. The master device 110 may transmit a signal (e.g., data) onto the single-wire interface 105 by driving the line 125.

The target device 115 is coupled to ground and receives both its power and signals from the single-wire interface 105 via a line 130. Within the target device 115, diode 135 is coupled in series with a capacitor 140 between the line 130 and ground. A series connection point 150 at a voltage $V_{CAP}$, between the diode 135 and a capacitor 140, is coupled to the power input of a target device function 145. Generally, device functions are any type of device intended to be controlled as a target coupled to the single-wire interface 105. The target device function 145 may send a signal (e.g., data) back to the master device 110 via the single-wire interface 105 by driving the line 130 using power stored in the capacitor 140.

With reference to FIG. 1B, during non-communication periods of the single-wire protocol, the single-wire interface signal $V_{BUS}$ is maintained at a specified logic level. For example, the master device 110 may provide a full voltage level from the external power supply 120 to the single-wire interface 105. This allows the capacitors 140 of target devices 115 coupled to the single-wire interface 105 to store charge for powering the target device 115.

During a communications sequence of the single-wire protocol, a first target transaction 170a begins with a first target transaction start time 165. A first capacitor discharge period 175a begins with the first target transaction start time 165 and concludes after the first target transaction 170a by an amount of time necessary for the target 115 to complete logic processing operations relative to that target transaction. Therefore, the first capacitor discharge period 175a is equal to or greater than the first target transaction 170a in length.

After the first capacitor discharge period 175a, a first capacitor recharge period 195a commences at a first bus release time 180a. The first bus release time 180a is determined by the master device 110 and is executed at a time sufficiently long after the conclusion of the first target transaction 170a such that all processing related to transactions on the single-wire interface 105 is concluded by the target device 115. The sufficiency of the period of time to wait for the first bus release time 180a after conclusion of the first capacitor discharge period 175a is determined by one skilled in the art during facilitation of the single-wire protocol with consideration of a literal implementation of the target 115 and the master device 110. For instance, the timing analysis is performed during or after logic design in implementing these bus elements.

The sufficiency of a charging period in general is determined by the longest period of time required to re-establish all charge on the capacitor 140 that has been depleted in a longest capacitor discharge period. For example, a second target transaction 170b in a communication sequence is similar to the first target transaction 170a discussed above. However, the duration of the second target transaction 170b may be different than the duration of the first target transaction 170a. The duration of a second capacitor discharge period 175b will likewise vary according to the duration of the second target transaction 170b. Therefore, a second capacitor recharge period 195b different from the first capacitor recharge period 195a may be required to fully replenish the charge on the capacitor 140.

Even with a longest period of time required for recharging the capacitor 140, there is still a significant drawback in that the recharge voltage level achieved is at one diode forward bias voltage drop 185 below the power supply voltage 190 provided on the single-wire interface 105. In a low voltage system, this amount of voltage drop 185 may mean that the available voltage level remaining to power target device functions may not be sufficient for proper operation of those functions or for the requisite duration. What is needed is a way of selectively providing a full power-supply voltage level 190 from the single-wire interface 105 to the capacitor 140 during periods of non-communication.

SUMMARY

An exemplary embodiment of a single-wire-interface system comprises a single-wire interface capable of providing electrical communication of signals and power between a plurality of devices coupled to the single-wire interface, including a master device driving the single-wire interface to communicate signals on that interface and maintaining a power supply voltage level on the interface during non-communication time periods, and a target device coupled to the interface device coupled to the interface to receive signals therefrom, wherein the target device includes a PMOS transistor acting as a switch coupled at its source to the single-wire interface, a charge storage device coupled to a drain of the PMOS transistor at a connection point, a device function coupled to the charge storage device at the connection point to receive stored power therefrom, and an inverter acting as a control device with an input coupled to the interface, a control output coupled to the gate of the PMOS transistor, and powered by the charge storage device at the connection point. The use of a PMOS transistor to couple the charge storage device to the interface allows full charging of the connection point to the power supply voltage level during non-communication time periods.

DETAILED DESCRIPTION

Figure 1A:
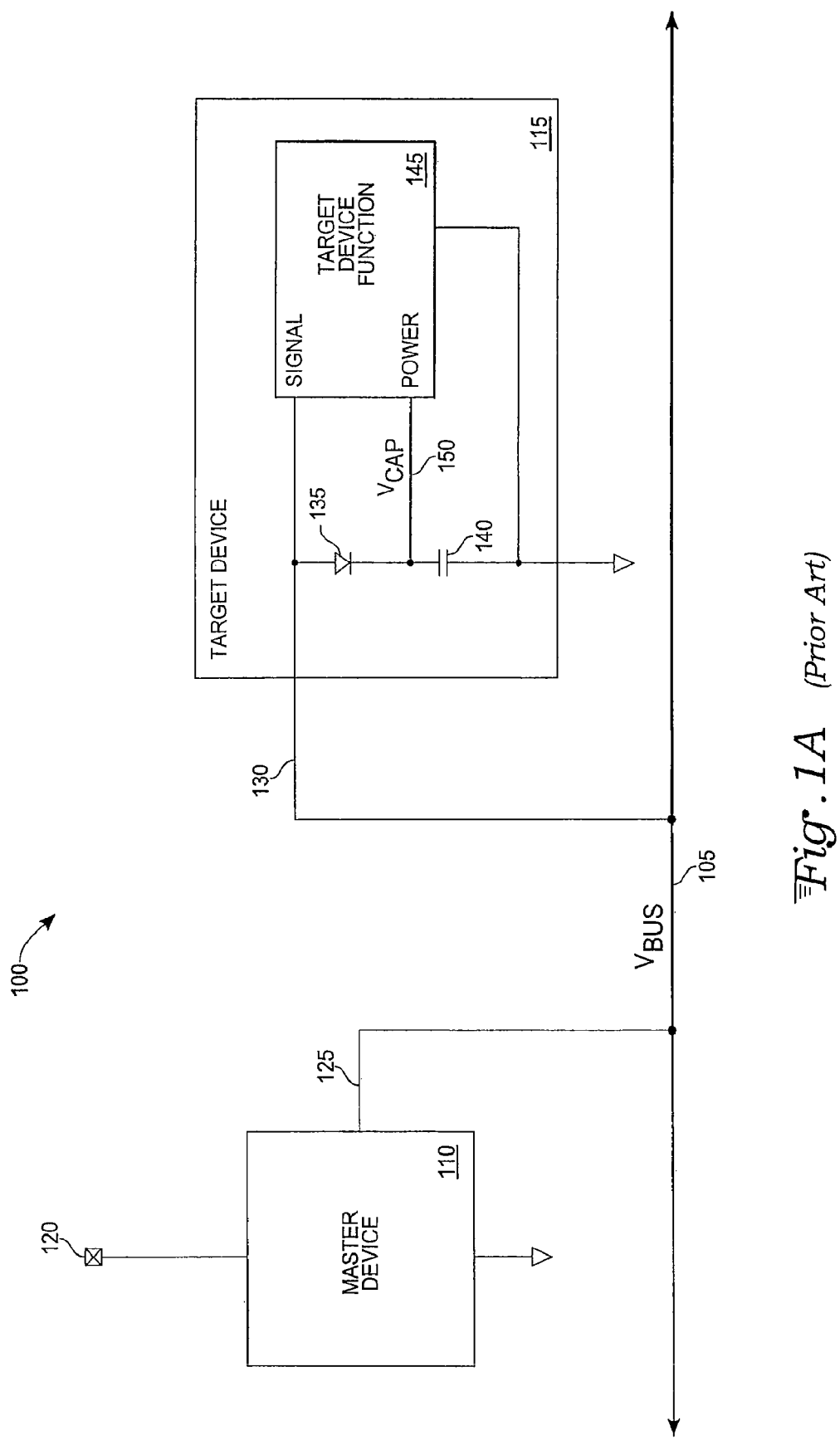
FIG. 1A is a logic diagram of a prior art single-wire-interface system.
Figure 1B:
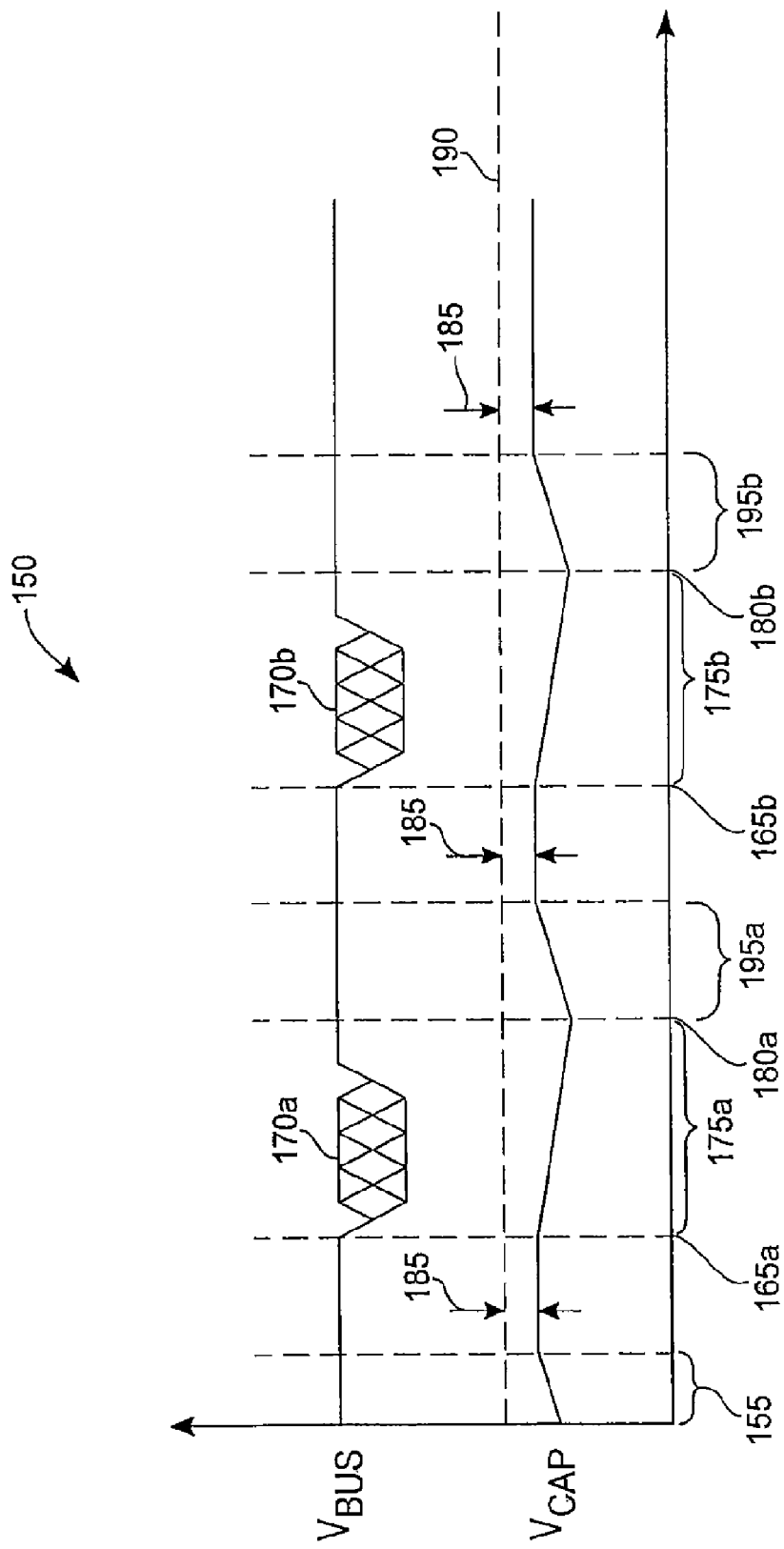
FIG. 1B is a waveform diagram corresponding to FIG. 1A.
Figure 2A:
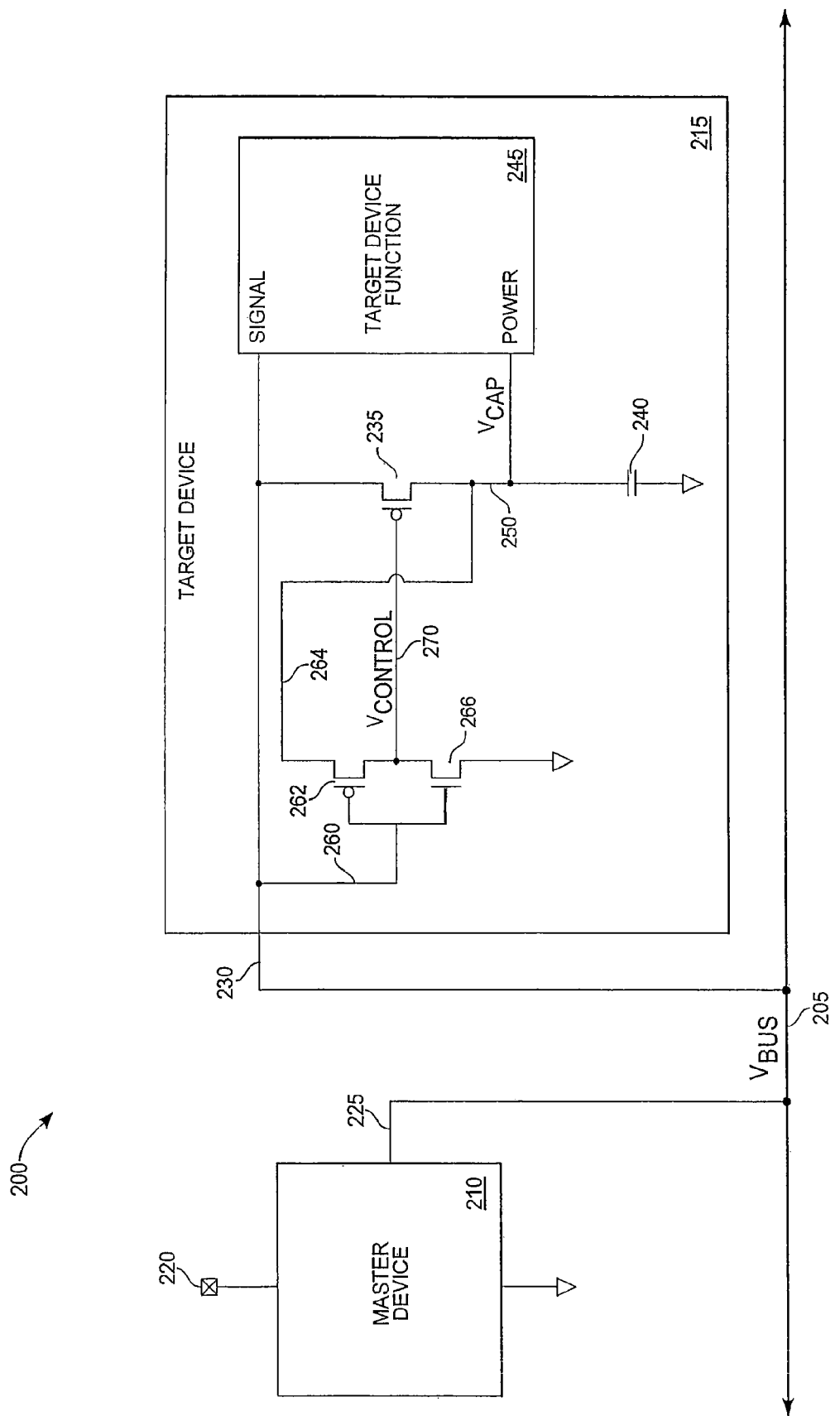
FIG. 2A is a logic diagram of an exemplary single-wire-interface system.

With reference to FIG. 2A, a single-wire interface 205 couples a master device 210, such as a microcontroller, to a target device 215 in an exemplary single-wire-interface system 200. A single-wire interface 205 is alternately known as a single-wire data bus, one-wire data bus, unibus, or a one-wire interface. A single wire is shared in common by all of the devices attached to the single-wire interface 205. The single-wire interface 205 implements a one-wire protocol by which bus level transactions across one wire communicate the signaling required both to control and power a target function.

The single-wire interface 205 connects devices of a system together to perform desired functions. In a general system context, a master device 210, such as a microcontroller, may alternately be referred to as a transmitter or an initiator controller, while the target device 215 may alternately be referred to as a receiver, a slave, or a target controller.

The master device 210 is coupled to an external power supply VDD 220 and ground, and is also coupled to the single-wire interface 205 via a line 225. The master device 210 may transmit a signal (e.g., data) onto the single-wire interface 205 by driving the line 225. The target device 215 is coupled to ground and receives both its power and signals from the single-wire interface 205 via a line 230. Within the target device 215, a PMOS transistor 235 is coupled in series with a capacitor 240 between the line 230 and ground. A series connection point 250 at a voltage $V_{CAP}$, between the PMOS transistor 235 and the capacitor 240, is coupled to a power input of a target device function 245. An inverter is made up of a PMOS transistor 262 and NMOS transistor 266, with gates coupled in common as an inverter input 260 to the line 230. A source 264 of the PMOS transistor 262 may be powered by voltage $V_{CAP}$ supplied at the connection point 250. A control input 270 of the inverter is coupled to a gate of the PMOS transistor 235. The PMOS transistor 235 may be implemented, for example, as a p-type metal oxide semiconductor field effect transistor (PMOSFET). Alternatively, the PMOS transistor 235 may be implemented as a depletion mode field effect transistor with a complementary control signal to that described in the present exemplary embodiment, or as any general bipolar or field effect transistor capable of being provided with voltages capable of biasing the device to provide a full power-supply voltage level.

Figure 2B:
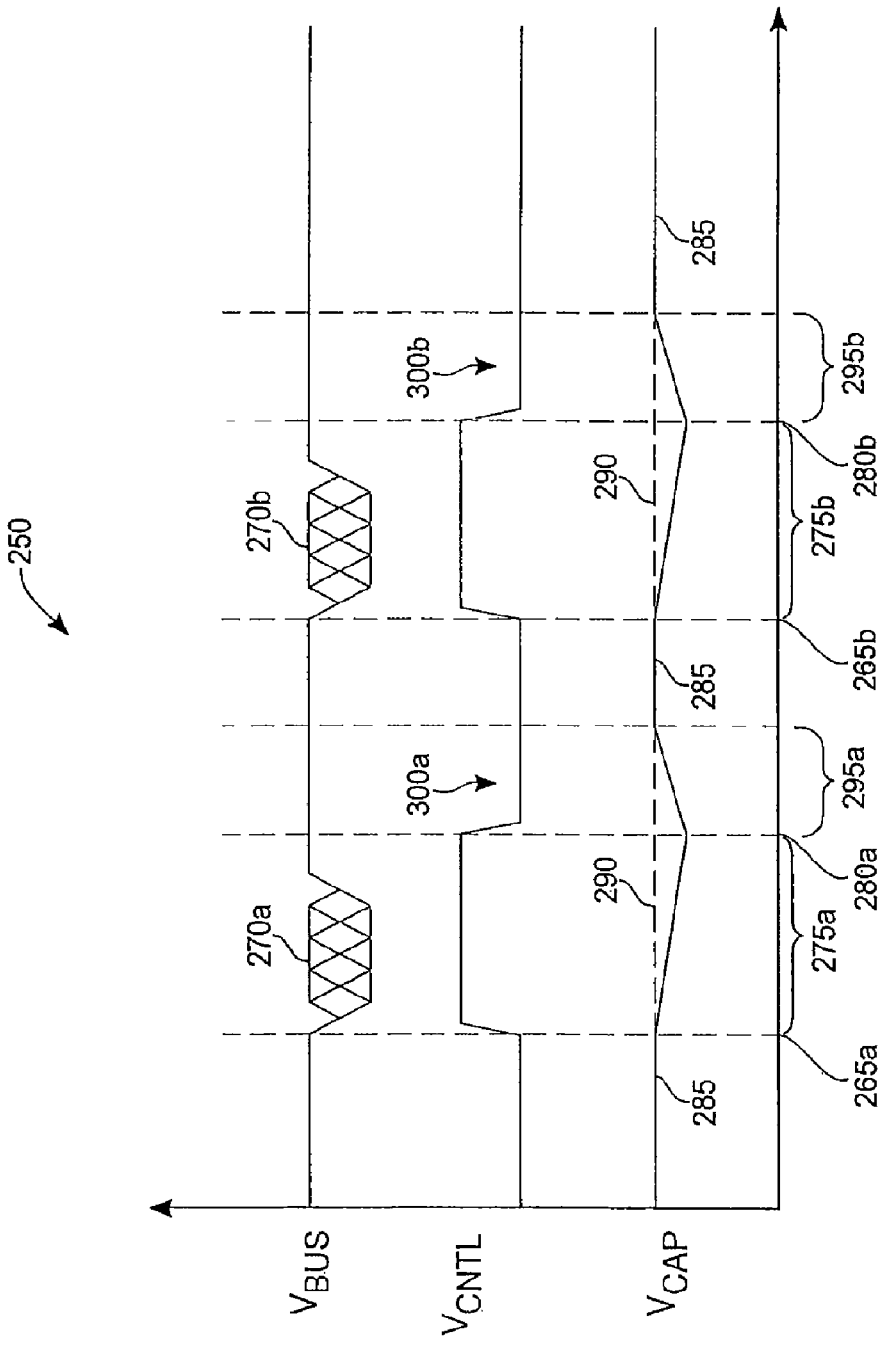
FIG. 2B is a waveform diagram corresponding to FIG. 2A.

With reference to FIG. 2B, the master device 210 and the target device 215 engage in bidirectional communication in a single-wire protocol through signaling on the single-wire interface 205. Communications are initiated and responded to by the master device 210 and the target device 215, respectively.

During non-communication periods of the single-wire protocol, the single-wire interface signal $V_{BUS}$ is at a power-supply-voltage level 290, the master device 210 coupled to an external power supply 220 may provide the power-supply voltage level VDD to the single-wire interface 205. The master device 210 may maintain timing and sequential logic state information internally (not shown) such that non-communication periods can be determined for maintaining the power-supply voltage level 290.

During a single-wire-protocol communication sequence, a first target transaction 270a begins at a first target transaction start time 265. The target device function 245 operates upon the data signal it receives from the single-wire interface 205 via line 230, consuming power as it operates. A first capacitor discharge period 275a concludes after the first target transaction 270a. The amount of time after the first target transaction 270a the first capacitor discharge period 275a concludes is the amount of time necessary to complete logic processing operations in the target device 215. Therefore, the first capacitor discharge period 275a is equal to or greater than the first target transaction 270a in length.

After the first capacitor discharge period 275a a first capacitor recharge period 295a commences at a first bus release time 280a. The first bus release time 280a is determined by the master device 210 and is executed at a time sufficiently long after the conclusion of the first target transaction 270a such that all processing related to transactions on the single-wire interface 205 are concluded by the target device 215. The sufficiency of the period of time to wait for the first bus released time 280a after conclusion of the first capacitor discharge period 275a is determined by one skilled in the art during facilitation of the single-wire protocol with consideration of a literal implementation of the target device 215 and the master device 210. For instance, a timing analysis is performed during or after logic design in implementing these bus elements.

The power-supply voltage level 290 is provided as the single-wire-interface voltage $V_{BUS}$ through the single-wire interface 205 to the target device 215 and to a source node of the PMOS transistor 235. The capacitor voltage $V_{CAP}$, is provided to the target device function 245 within the target 215, and also to the source of PMOS transistor 262.

The first capacitor recharge period 295a is sufficiently long to allow the capacitor voltage $V_{CAP}$ to attain a maximum level 285 equal to the power-supply voltage level 290. The first capacitor recharge period 295a is facilitated by the inverter (transistors 262 and 264) providing a low-logic level $V_{CNTL}$ on its control output 270 (seen at 300a in FIG. 2B) that is applied to the gate of the PMOS transistor 235. This allows the power supply voltage VDD on the single-wire interface 205 to charge the capacitor 240 via line 230 of the target device 205. The low-logic level 300a on the PMOS control signal $V_{CNTL}$ is provided as long as the single-wire interface signal $V_{BUS}$ is high, which should be at least for a period of time sufficiently long to provide charge to the capacitor 240 for the full duration of the first capacitor recharge period 295a.

The PMOS transistor 235 has a transconductance characteristic such that the low-level logic signal on the PMOS control signal $V_{CNTL}$ allows the capacitor 240 to be charged to the power-supply voltage level 290. Since the master device 210 is capable of supplying external power supply voltage VDD 220 to the single-wire interface 205, the capacitor 240 charges completely to the power-supply-voltage level (as seen at 285 in FIG. 2B) with no device voltage drop due to the PMOS transistor 225.

The PMOS control signal $V_{CNTL}$ is held by the inverting transistors 262 and 266 at a low logic level 300a during a first charging period 295a for as long as the single-wire interface 205 is maintained at the power supply voltage level. This holding of $V_{CNTL}$ at a low logic level 300a establishes a charging period, during which the PMOS transistor 235 is turned on, allowing the capacitor 240 to be charged. Sufficiency of a charging period duration is determined by the length of time necessary to satisfy the complete charge requirement of a charge storage device, such as for example, the capacitor 240, so that the capacitor voltage $V_{CAP}$ attains a full power-supply voltage level 290 (as seen at 285). The master device 210 may refrain from placing a transaction onto the single-wire interface 205 until the requisite charging period 295a has elapsed. The sufficiency of a charging period in general is determined by the length of the preceding capacitor discharge period 275a.

A second target transaction 270b in a communication sequence, at any time after the conclusion of the first capacitor recharge period 295a, is similar to the first target transaction 270a discussed above. However, the duration of the second target transaction 270b may be different (e.g. longer) than the duration of the first target transaction 270a. The duration of a second capacitor discharge period 275b will vary according to the duration of the second target transaction 270b. A second capacitor recharge period 295b is required to provide the full power-supply voltage level 285 on the capacitor 240. A second capacitor recharge period 295b may be longer in duration than the first capacitor recharge period 295a in order to provide the full power-supply voltage level 285 on the capacitor 240. Again, this recharging of the capacitor 240 is facilitated by the low-logic level 300b on the PMOS control signal $V_{CNTL}$, allowing the PMOS transistor 265 to be ON, for as long as the single-wire interface signal $V_{BUS}$ is a logic-high signal.

Alternatively, one skilled in the art may design an exemplary single-wire-interface system 200 with all capacitor recharging periods 295a, 295b, etc. being equal in duration, provided that duration is sufficiently long to accommodate any capacitor discharge period expected in the interface system. By following practices to those put forth above, a maximum target transaction duration and corresponding capacitor discharge period may be taken into account by the artisan and a charging period equal to or longer than the maximum target transaction duration may be configured to be provided for the target device 215.

What is claimed is:

1. A single-wire-interface target device comprising:
    a signal line capable of being coupled to a single-wire interface, the single-wire interface capable of providing electrical communication of both signals and power between a plurality of devices coupled to the single-wire interface;
    a device function having a signal port coupled to the signal line and having a power input port;
    a PMOS transistor coupled at a source to the signal line, the PMOS transistor also having a drain and a control gate;
    a charge storage device coupled to the drain of the PMOS transistor at a connection point and to the power input port of the device function at said connection point; and
    a control device having an input coupled to the signal line, a control output coupled to the gate of the PMOS transistor, and powered by the charge storage device at the connection point, such that the PMOS transistor is active to charge the storage device whenever the single-wire interface is at a power supply voltage level.

2. The single-wire-interface target device of claim 1, wherein a power-supply voltage level is provided over the single-wire interface after all communication on the single-wire interface is suspended.

3. The single-wire-interface target device of claim 1, wherein the control device is an inverter comprising a second PMOS transistor and an NMOS transistor coupled in series, with gates in common forming the input of the control device, a drain of the second PMOS transistor forming the control output of the control device, and a source of the PMOS transistor coupled to the charge storage device at the connection point.

4. The single-wire-interface target device of claim 1, wherein the charge storage device is a capacitor.

5. A single-wire-interface system comprising:
    a single-wire interface capable of providing electrical communication of signals and power between a plurality of elements coupled to the single-wire interface;
    a master device coupled to a power-supply terminal and to the single-wire interface, the master device adapted to drive the single-wire interface to communicate signals thereon and to maintain a power supply voltage level on the single-wire interface during non-communication time periods of the single-wire interface; and
    at least one target device coupled to the single-wire interface via a signal line, each target device further comprising (1) a device function having a signal port coupled to the signal line and a power input port, (2) a PMOS transistor coupled at a source to the signal line and having a drain and a control gate, (3) a charge storage device coupled to the drain of the PMOS transistor at a connection point and to the power input port at said connection point, and (4) a control device having an input coupled to the signal line, a control output coupled to the gate of the PMOS transistor, and powered by the charge storage device at the connection point, such that the PMOS transistor is active to charge the storage device whenever the single-wire interface is at a power supply voltage level.

6. The single-wire-interface system of claim 5, wherein the master device and the target device are configured to suspend communication on the single-wire interface for a charging period of the charge storage device, the charging period sufficient to allow the switch to provide a power-supply voltage level to the charge storage device.

7. The single-wire-interface system of claim 5, wherein the charge storage device is a capacitor.

8. The single-wire-interface system of claim 5, wherein the control device is an inverter comprising a second PMOS transistor and an NMOS transistor coupled in series, with gates in common forming the input of the control device, a drain of the second PMOS transistor forming the control output of the control device, and a source of the PMOS transistor coupled to the charge storage device at the connection point.

9. A device comprising:
    a line configured to provide electrical communication of both signals and power;
    a device function having a signal port coupled to the line and having a power input port;
    a transistor coupled between the signal port and the power input port;
    a charge storage device coupled to the power input port of the device function; and
    a control device having an input coupled to the line, an output coupled to a gate of the transistor, and powered by the charge storage device.

10. The device of claim 9, wherein the control device comprises a PMOS transistor and an NMOS transistor coupled in series between the power input port and a ground potential.

11. The device of claim 10, wherein the charge storage device comprises a capacitor.

12. The device of claim 11, wherein the line is configured to couple to a single-wire-interface to receive the signals and the power from the single-wire-interface at different times.

* * * * *